US006855797B2

(12) United States Patent
Putzig et al.

(10) Patent No.: US 6,855,797 B2
(45) Date of Patent: Feb. 15, 2005

(54) STABLE AQUEOUS SOLUTIONS COMPRISING TITANIUM AND ZINC AND PROCESS THEREWITH

(75) Inventors: Donald Edward Putzig, Newark, DE (US); Edward Francis McBride, Wilmington, DE (US); Clive Alexander Hamilton, Stokesley (GB); Andrea Clare Smith, Houghton-le Spring (GB)

(73) Assignee: E. I. du Pont de Nemours and Company, Wilmington, DE (US)

( * ) Notice: Subject to any disclaimer, the term of this patent is extended or adjusted under 35 U.S.C. 154(b) by 174 days.

(21) Appl. No.: 10/132,347

(22) Filed: Apr. 25, 2002

(65) Prior Publication Data

US 2003/0204043 A1 Oct. 30, 2003

(51) Int. Cl.$^7$ .................... C08G 63/78; C08G 3/02
(52) U.S. Cl. .............. 528/279; 528/280; 528/281; 528/286; 524/706; 524/767; 524/783; 524/785
(58) Field of Search ................ 528/279, 280, 528/281, 286; 524/286, 706, 767, 783, 785

(56) References Cited

U.S. PATENT DOCUMENTS

| | | |
|---|---|---|
| 3,404,121 A | 10/1968 | Barkey |
| 4,501,878 A | 2/1985 | Adams |
| 4,611,049 A | 9/1986 | Kuratsuji et al. |
| 4,694,099 A | 9/1987 | Ahlfors et al. |
| 5,041,621 A | 8/1991 | Morris et al. |
| 5,095,135 A | 3/1992 | Yamada et al. |
| 5,237,042 A | 8/1993 | Kim et al. |
| 5,340,907 A | 8/1994 | Yau et al. |
| 5,344,964 A | 9/1994 | Chu et al. |
| 5,385,773 A | 1/1995 | Yau et al. |
| 5,519,108 A | 5/1996 | Yuo et al. |
| 5,532,392 A | 7/1996 | Gheorghiu |
| 5,714,570 A | 2/1998 | Kim et al. |
| 5,866,710 A | 2/1999 | Ridland et al. |
| 5,907,054 A | 5/1999 | Setoyama et al. |
| 6,013,756 A | 1/2000 | Hagen et al. |
| 6,080,834 A | 6/2000 | Putzig et al. |
| 6,133,404 A | 10/2000 | Kang et al. |
| 6,140,458 A | 10/2000 | Terado et al. |
| 6,166,170 A | 12/2000 | Putzig et al. |
| 6,258,925 B1 | 7/2001 | Dowling et al. |
| 6,277,947 B1 | 8/2001 | Kelsey et al. |
| 6,346,070 B1 | 2/2002 | Ohmatsuzawa et al. |

FOREIGN PATENT DOCUMENTS

| | | |
|---|---|---|
| EP | 0 699 700 A2 | 3/1996 |
| EP | 1 065 230 A2 | 1/2001 |
| EP | 1 090 943 A2 | 4/2001 |
| EP | 1 120 392 A1 | 8/2001 |
| EP | 1 035 915 B1 | 9/2001 |
| JP | 80-35020 A | 2/1985 |
| JP | 2-155920 A | 6/1990 |
| JP | 8-283393 A | 10/1998 |
| JP | 2000-178349 A | 6/2000 |
| JP | 2001-213948 A | 8/2001 |

*Primary Examiner*—Samuel A. Acquah

(57) ABSTRACT

A process that can be used as catalyst in esterification, transesterification or polycondensation is disclosed, which comprises a stable solution comprising (a) titanium in the form of a titanium α-hydroxycarboxylic acid or its salt, (b) a $C_1$–$C_6$ carboxylic acid, and (c) zinc in the form of a water-soluble zinc salt, and (d) water. Also disclosed is an esterification, transesterification or polycondensation process, which comprises contacting, in the presence of the solution process, an organic acid or its ester or its salt with an alcohol, optionally in the presence of a phosphorus compound, an organic or inorganic toning agent such as cobalt acetate, or combinations thereof. The process can also comprise combining aqueous solutions of a titanium α-hydroxycarboxylic acid or its salt and a zinc salt in an alcohol to produce an alcohol solution contacting the alcohol solution with a mixture comprising organic acid or its ester or its salt and a second alcohol, or comprise combining an aqueous solutions of a titanium α-hydroxycarboxylic acid or its salt and aqueous solution of a zinc salt with the mixture.

29 Claims, No Drawings

STABLE AQUEOUS SOLUTIONS COMPRISING TITANIUM AND ZINC AND PROCESS THEREWITH

FIELD OF THE INVENTION

This invention relates to a catalyst composition comprising a stable aqueous solution of organic titanium and zinc complexes and to a process for using the composition in, for example, esterification, transesterification, or polymerization of a carbonyl compound.

BACKGROUND OF THE INVENTION

Polyesters such as, for example, polyethylene terephthalate, polytrimethylene terephthalate and polybutylene terephthalate, generally referred to as "polyalkylene terephthalates", are a class of important industrial polymers. They are widely used in thermoplastic fibers, films, and molding applications.

Polyalkylene terephthalates can be produced by transesterification of a dialkyl terephthalate ester with a glycol followed by polycondensation or by direct esterification of terephthalic acid with the selected glycol followed by polycondensation. A catalyst is used to catalyze the esterification, transesterification and/or polycondensation.

Antimony, in the form of a glycol solution of antimony oxide, frequently is used as catalyst in the transesterification or esterification process. However, antimony forms insoluble antimony complexes that plug fiber spinnerets and leads in fiber spinning to frequent shutdowns to wipe spinnerets clean of precipitated antimony compounds. The antimony-based catalysts are also coming under increased environmental pressure and regulatory control, especially in food contact applications.

Organic titanates, such as tetraisopropyl and tetra n-butyl titanates, are known to be effective polycondensation catalysts for producing polyalkylene terephthalates in general, and frequently are the catalyst of choice. However, these catalysts tend to hydrolyze on contact with water, forming glycol-insoluble oligomeric species which lose catalytic activity. These organic titanates also generate a significant amount of yellow discoloration when used as polyesterification catalysts. Additionally, many organic titanate catalysts are also substantially insoluble in a polymerization mixture thereby creating non-uniform distribution of catalyst in the mixture.

U.S. Pat. Nos. 3,404,121 and 5,340,907 disclose using a combination of zinc acetate and tetraisopropyl titanate as catalysts. When metal salts such as zinc acetate are added to the reaction mass as a solid, it is difficult to control the feed rate uniformly, resulting in variation of the polymerization conditions. When added as a glycol solution, the solubility is quite low and the metal may precipitate over time. The use of a water solution is not compatible with the use of tetraisopropyl titanate because of hydrolysis. Also, water-compatible titanates, when used as polyesterification catalysts, generate significant yellow discoloration in the resultant polymer. See, for example, EP 812818 and WO 99/28033. There is, therefore, a need for a catalyst system that is compatible with water, has good catalytic activity, and produces a polymer with reduced color.

Additionally, many solutions of a titanium α-hydroxycarboxylate and a water-soluble zinc salt are not stable, in that they form a cloudy solution or a gel after only a short period of time. This is undesirable, for it may lead to poor control of the catalyst feed to the reaction zone, to an uneven product quality, or to plugging up the down stream spinnerets. Solving this potential problem by adding more water is undesirable because the added volume makes it difficult to store or ship economically. There is also a need for a water-compatible catalyst that has good catalytic activity, produces a polymer with reduced color, is environmentally friendly, does not result in plugging fiber spinnerets, is relatively concentrated, and is stable.

An advantage of the invention is that a titanium- and zinc-containing catalyst solution can be stabilized for over two weeks under accelerated storage conditions of 60° C., equivalent to much longer storage times at ambient conditions by inclusion of a carboxylic acid. Other advantages of the inventive system will become more apparent as the invention is more fully disclosed herein below.

SUMMARY OF THE INVENTION

A first embodiment of the invention provides an aqueous catalyst composition which can be used as an esterification, transesterification or polycondensation catalyst. The composition comprises a stable solution comprising (a) titanium in the form of a titanium α-hydroxycarboxylic acid or its salt, (b) a $C_1$–$C_6$ aliphatic carboxylic acid, (c) zinc in the form of a water-soluble zinc salt, and (d) water.

A second embodiment of the invention provides a process, which comprises contacting, in the presence of a solution composition disclosed in the first embodiment of the invention, an organic acid or its ester or its salt with an alcohol, optionally in the presence of a phosphorus compound, an organic or inorganic toning agent such as cobalt acetate, or combinations thereof. The process can also comprise combining aqueous solutions of a titanium α-hydroxycarboxylic acid or its salt and a water-soluble zinc salt in an alcohol and contacting the resulting solution with a mixture comprising organic acid or its ester or its salt and a second alcohol or comprise combining aqueous solutions of a titanium α-hydroxycarboxylic acid or its salt and aqueous solution of a zinc salt with the mixture comprising organic acid or its ester or its salt.

DETAILED DESCRIPTION OF THE INVENTION

The stable aqueous solution comprising organic titanium and zinc compounds can be used as catalyst in esterification, transesterification, polycondensation, or combinations of two or more thereof. If used for polycondensation, it can be added to a polymerization medium before or during the esterification, transesterification, or polycondensation step.

According to the first embodiment of the invention, a storage-stable catalyst composition is provided, which comprises a solution comprising a titanium α-hydroxycarboxylic acid or salt, a $C_1$–$C_6$ aliphatic carboxylic acid, a water-soluble zinc salt and water. By "stable", it is meant that the solution is capable of remaining in substantial solution and no visible cloud, gel or precipitate appears under accelerated storage conditions for at least 2, preferably at least 3, and most preferably at least 4 weeks at 25 to about 60° C. under about atmospheric pressure. The term "substantial" refers to more than trivial. The term "stable" is also exchangeable with "storage-stable" in this disclosure.

Titanium α-hydroxycarboxylic acid can be prepared by reacting a titanium orthoester with an α-hydroxycarboxylic acid. The titanium orthoester is typically expressed by the general formula $Ti(OR)_4$ where each R is individually selected from an alkyl, cycloalkyl, alkaryl, hydrocarbyl radical containing from 1 to about 30, preferably 2 to about 18, and most preferably 2 to 12 carbon atoms per radical and each R can be the same or different. Examples of commercially available organic titanium compounds include, but are not limited to, TYZOR® TPT and TYZOR® TBT, (tetra isopropyl titanate and tetra n-butyl titanate, respectively), available from E. I. du Pont de Nemours and Company, Wilmington, Del., USA.

In reaction of a titanium orthoester with an α-hydroxycarboxylic acid, the α-hydroxycarboxylic acid replaces two of the R groups in the titanium orthoester. Suitable α-hydroxycarboxylic acids include any carboxylic acid of 1 to 6 carbon atoms comprising carbon, hydrogen and oxygen atoms, and having a hydroxy group in the α-position. Examples of suitable α-hydroxycarboxylic acids include, but are not limited to, citric acid, lactic acid, malic acid, tartaric acid, glycolic acid, glyceric acid, α-hydroxybutyric acid, α-hydroxypropionic acid, and combinations of two or more thereof. The α-hydroxycarboxylic acids are well known in the art and are disclosed for example in U.S. Pat. No. 2,870,181. The reaction can be followed by neutralization with a base such as ammonia or an alkali metal, or by reaction with a quaternary ammonium group. The preferred titanium α-hydroxycarboxylate salt is titanium bis-ammonium lactate, commercially available as TYZOR® LA (in a solution form containing 8.2 weight % titanium) from DuPont, Wilmington, Del.

The composition also includes a water-soluble zinc salt. The term "water-soluble" means that it is soluble in more than a trivial amount. Examples of suitable zinc salts include, but are not limited to, zinc acetate, zinc chloride, zinc nitrate, zinc sulfate, and combinations of two or more thereof. The preferred zinc salt is zinc acetate.

The $C_1$–$C_6$ aliphatic carboxylic acid useful for producing the solution can be any carboxylic acid that can produce a stable solution of the invention. It can be the same α-hydroxycarboxylic acid as those disclosed above for producing the titanium α-hydroxycarboxylic acid or salt. Examples of suitable $C_1$–$C_6$ aliphatic carboxylic acids include, but are not limited to, formic acid, acetic acid, propionic acid, butyric acid, pentanoic acid, hexanoic acid, citric acid, lactic acid, malic acid, tartaric acid, glycolic acid, glyceric acid, α-hydroxybutyric acid, α-hydroxypropionic acid, and combinations of two or more thereof. The preferred $C_1$–$C_6$ aliphatic carboxylic acid is lactic acid.

The inventive solution can contain about 0.1 to about 10, preferably about 0.5 to about 10, and most preferably about 0.5 to about 2.5 weight % titanium in the form of a titanium α-hydroxycarboxylic acid or its salt, or about 5 to about 30 weight % expressed as commercial titanium bis-ammonium lactate solution (TYZOR® LA). The invention solution can contain about 0.1 to about 30, preferably about 0.5 to about 30, and most preferably 0.5–20 weight % zinc in the form of a water-soluble zinc salt. The inventive solution can contain 0.05 to about 10, preferably about 0.1 to about 10, and most preferably 0.1 to about 5 weight % of a $C_1$–$C_6$ aliphatic carboxylic acid. Water generally can make up the rest of the composition. An example of a preferred solution can contain about 5–30 weight % titanium bis-ammonium lactate solution (8.2 weight % titanium), about 1–5 weight % lactic acid, and about 20–30 weight % zinc acetate, dissolved in water.

The inventive solution can include other ingredients, such as a phosphorus compound to improve whiteness, or a cobalt compound to act as a color toner or co-catalyst, providing that they do not adversely affect the stability of the solution. For example, the storage-stable solution can contain about 0 to about 15 weight % phosphorus in the form of a water-soluble phosphorus compound, providing the molar ratio of (titanium plus zinc) to phosphorus is greater than about 1.5. Other ingredients such as cobalt can be present in about the same concentration as phosphorus.

The individual components can be combined in any order and the catalyst composition can be produced by any means known to one skilled in the art. Generally, the mixture can be stirred at a temperature in the range of from about 0° C. to about 100° C., preferably about 20° C. to about 50° C.

According to the second embodiment of the invention, a process that can be used in, for example, the production of an ester or polyester is provided. The process comprises contacting, in the presence of a catalyst composition, an organic acid with an alcohol. The catalyst composition can be the same as that disclosed above.

A preferred process for producing an ester or polyester comprises, consists essentially of, or consists of contacting a reaction medium with a composition disclosed above in the first embodiment of the invention. The reaction medium can comprise, consist essentially of, or consist of an alcohol and either (1) an organic acid, a salt thereof, an ester thereof, or combinations thereof or (2) an oligomer having repeat units derived from an organic acid or ester.

The organic acid or ester thereof can have the formula of $R^1COOR^1$ in which each $R^1$ independently can be (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyl radical, or combinations of two or more thereof. The presently preferred organic acid is an organic acid having the formula of $HO_2CACO_2H$ in which A is an alkylene group, an arylene group, alkenylene group, or (4) combinations of two or more thereof. Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof. The presently preferred organic diacid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, and combinations of two or more thereof.

Examples of carboxylic acid metal salts or esters thereof includes a 5-sulfo isophthalate metal salt and its ester having the formula of $(R^2O_2C)_2ArS(O)_2OM$ in which each $R^2$ can be the same or different and is hydrogen or an alkyl group containing 1 to about 6, preferably 2, carbon atoms. Ar is a phenylene group. M can be an alkali metal ion such as sodium. An example of the ester is bis-glycolate ester of 5-sulfo isophthalate sodium salt.

Any alcohol that can esterify an acid to produce an ester or polyester can be used in the present invention. The presently preferred alcohol has the formula of $R(OH)_n$, an alkylene glycol of the formula $(HO)_nA^1(OH)_n$, or combinations thereof in which R is the same as that disclosed above; n is a number of 1 to about 10, and preferably 1 to 5; and $A^1$ is an alkylene group having 2 to about 10, preferably 2 to 7, and most preferably 2 to 4, carbon atoms. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently most preferred alcohol is an alkylene glycol such as ethylene glycol for the polyester produced therefrom has a wide range of industrial applications.

The contacting of an organic acid and alcohol in the presence of the catalyst can be carried out by any suitable means. For example, the organic acid and alcohol can be combined before being contacted with the catalyst. Also for example, the catalyst can be first dissolved in an alcohol by any suitable means such as mechanical mixing or stirring followed by combining the solution with (1) a carbonyl compound and (2) an alcohol under a condition sufficient to effect the production of an ester or polyester. In the preparation of a polyalkylene terephthalate, it is preferred that the aqueous catalyst solution be dissolved in an alkylene glycol and then fed to the reaction mixture.

The oligomer of an organic acid and alcohol generally has a total of about 1 to about 100, preferably from about 2 to about 10 repeat units derived from the carbonyl compound and alcohol.

Any suitable condition to effect the production of an ester or polyester can include a temperature in the range of from about 150° C. to about 500° C., preferably about 200° C. to about 400° C., and most preferably 250° C. to 300° C. under a pressure in the range of from about 0.001 to about 10 atmospheres for a time period of from about 0.2 to about 20, preferably about 0.3 to about 15, and most preferably 0.5 to 10 hours.

The molar ratio of the alcohol to organic acid can be any ratio so long as the ratio can effect the production of an ester or polyester. Generally, the ratio can be in the range of from about 1:1 to about 10:1, preferably about 1:1 to about 5:1, and most preferably 1:1 to 4:1.

The catalyst, expressed as Ti, can be present in the range of about 0.0001 to about 30,000 parts per million (ppm) by weight of the medium comprising the organic acid and alcohol, preferably about 0.001 to about 1,000 ppm, and most preferably 0.001 to 100 ppm. Other ingredients also can be present to enhance catalyst stability or performance.

The catalyst composition can be used in producing esters or polyesters by using any of the conventional melt or solid state techniques. The catalyst compositions are compatible with conventional esterification and transesterification catalysts (e.g., manganese, cobalt, and/or zinc salts) and may be introduced to the production process concurrent with, or following, introduction of the esterification catalyst. The catalyst compositions also have been found to be effective in promoting the esterification reaction, and may be used as a substitute for some or all of the esterification catalyst.

The second embodiment of the invention also provides an antimony-free process for the preparation of polyalkylene terephthalates, which comprises combining (1) aqueous solution of a titanium α-hydroxycarboxylic acid or its salt and (2) aqueous solution of a zinc salt with an alcohol, such as alkylene glycol, to produce a glycol solution and contacting the glycol solution with a mixture of terephthalic acid or ester and an alkylene glycol monomer under reaction conditions. While the aqueous solution can correspond to that described in the first embodiment, it is not limited to that composition, i.e., it does not have to be a single, storage-stable solution.

Alternatively, the process for the preparation of polyalkylene terephthalates can comprise combining (a) aqueous solution of a titanium α-hydroxycarboxylic acid or its salt in an alcohol and (b) aqueous solution of a zinc salt in an alcohol, such as alkylene glycol, to produce a glycol solution and contacting the glycol solutions with a mixture comprising an organic acid disclosed above such as terephthalic acid or ester thereof and a second alkylene glycol under esterification, transesterification, or polycondensation conditions. Further alternatively, solutions (a) and (b) can be separately combined with a mixture comprising an organic acid or ester and an alkylene glycol monomer under esterification, transesterification, or polycondensation conditions. The definition of titanium, α-hydroxycarboxylic acid, zinc salt, and alcohol and quantities thereof can be the same as those disclosed above. Optionally, various stabilizing agents, color toners, co-catalysts or other ingredients can be included in the process, either separately or as part of the above aqueous solutions.

The invention process can also use a soluble cobalt compound such as cobalt acetate to aid the catalysis and improve the color of the final polymer by acting as a toner. The amount used is preferably from zero up to about equal weight of titanium used. It can conveniently be added as part of the inventive catalyst solution providing the amount added does not interfere with solution stability.

The invention process can also use a phosphorus compound to improve the color of the final polymer. While any of the many known phosphorus color inhibitors for preparation of polyalkylene terephthalates can be used, phosphoric acid is preferred for its ready availability. The phosphoric acid can be added separately, or as part of the aqueous solution. The amount of phosphorus compound added may be up to about 15 weight % phosphorus relative to the solution, providing it does not interfere with solution stability.

Phosphorus acts to reduce catalyst effectiveness. Preferably it is added after the esterification or transesterification step is completed. For example, when using terephthalic acid and ethylene glycol to make polyethylene terephthalate by the esterification route, a catalyst is typically only required for the polycondensation step, and the phosphorus compound can be part of the aqueous catalyst solution for the polycondensation. When using dimethyl terephthalate and ethylene glycol to make polyethylene terephthalate by the transesterification route, manganese compounds are typically the transesterification catalyst of choice. The use of manganese may cause formation of some undesirable color. The addition of a phosphorus compound can reduce this color problem, and can be added as part of the inventive catalyst solution for the polycondensation step.

Generally, the preferred molar ratio can be $2 \leq Zn/Ti \leq 30$ and, if phosphorus and cobalt are used, $1 \leq (Ti+Zn+Co)/P \leq 20$.

A process of particular commercial importance is the production of polyethylene terephthalate. This is typically carried out by one of two routes: the transesterification of dimethyl terephthalate (DMT) with ethylene glycol followed by polycondensation, and the esterification of terephthalic acid (TPA) with ethylene glycol followed by polycondensation.

In DMT-based technology, manganese is preferably used as transesterification catalyst in the amount of about 80 to 160 ppm, preferably about 100 to about 120 ppm based on the total quantity of terephthalic acid. When transesterification is complete a phosphorus compound, about 0.1 to about 100 ppm P based on the total quantity of terephthalic acid can be added to deactivate the manganese. Then antimony (about 200 ppm based on the total quantity of terephthalic acid) or titanium (about 20 ppm based on the total quantity of terephthalic acid) can be used for the polycondensation step.

The inventive aqueous catalyst composition can be used in the DMT-based process in several ways. It can be added in the transesterification step to substitute for all or part of the manganese to obtain a faster transesterification. Phosphorus can be added to eliminate any manganese used. The inventive catalyst solution can also be used in the polycondensation step to eliminate the use of antimony or to reduce the amount of titanium and its related color problems. The use of zinc permits the amount of titanium to be reduced by about 50%. If necessary to improve the color, about 0.1 to about 100 ppm of cobalt can be added to act as a color toner.

The inventive catalyst solution can also be used in the TPA-based process. It can be added prior to esterification if there is a need to speed up this step. Any phosphorus needed can be added after esterification. Alternatively, the inventive catalyst solution can be added after esterification to the resulting oligomer. As with the DMT-based process, it can be used in the polycondensation step to eliminate the use of antimony or to reduce the amount of titanium and its related color problems. If necessary to improve the color, about 0.1 to about 100 ppm of cobalt can be added as toner.

The following Examples are provided to further illustrate the present invention and are not to be construed as to unduly limit the scope of the invention. All TYZOR® products noted in the examples were obtained from DuPont, Wilmington, Del., USA.

EXAMPLE 1

The following solutions were prepared by mixing ingredients shown in Table 1, combining ingredients in any order and mixing by manual stirring at room temperature (about 25° C.), with the weight shown in grams. The solutions were then stored at 60° C. to provide an accelerated aging test, and periodically examined for signs of instability. Results are shown below.

TABLE 1

Composition of Test Solutions A to G

| Compound | A | B | C | D | E | F | G |
|---|---|---|---|---|---|---|---|
| 1) TYZOR ® LA | 244 | 244 | 244 | 244 | 244 | 244 | 244 |
| 2) Zinc acetate | 537 | 537 | 403 | 403 | 268 | 268 | 403 |
| 3) Water | 1200 | 1200 | 800 | 800 | 538 | 538 | 800 |
| 4) Lactic Acid | 0 | 43 | 0 | 33 | 0 | 22 | 0 |
| 5) Acetic Acid | 0 | 0 | 0 | 0 | 0 | 0 | 25 |

The storage stability tests (by visual observation) showed that Solution A gelled overnight at 60° C., while Solution B containing lactic acid was storage stable at 60° C. for 4 weeks. Similarly Solution C gelled in 3 days at 60° C., while Solution D containing lactic acid was storage-stable at 60° C. for 4 weeks. Solution E became cloudy after 21 days at 60° C., while Solution F containing lactic acid was storage-stable at 60° C. for 4 weeks. Solution G was also storage-stable at 60° C. for 4 weeks.

The above tests show that a stable aqueous solution can be prepared by mixing a titanium bis-ammonium lactate complex with lactic acid or acetic acid, zinc acetate and water. If the lactic acid or acetic acid is left out, the mixture will gel or cloud up under accelerated storage conditions (60° C.).

EXAMPLE 2

This example shows runs using the inventive catalyst and process. The process for producing terephthalic acid-based polymer is illustrated as follows. A 1-liter resin kettle was provided with a Jiffy Mixer agitator rotating at 40 rpm, a thermocouple, condenser and nitrogen sweep. To this kettle was added the catalyst to be tested, 115 ml of ethylene glycol, and 400 g of terephthalic acid oligomer prepared above. The agitator was turned on and the temperature was increased to 275° C. over a period of about 2.5 hours. The contents were polymerized by holding under agitation at 275° C. and a pressure of 120 mm Hg for 20 minutes, and at 280° C. and a pressure of 30 mm Hg for an additional 20 minutes. The contents were then held under agitation at 285° C. at 1 to 2 mm Hg pressure for a time sufficient to reach 15 ounce-inch (0.106 Newton-meter) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer. Results comparing the color as measured spectrophotometrically are given in Table 2 below.

Color of the resulting polymer was measured in terms of the L-value and b-value, using an instrument such as the SP-78 Spectrophotometer. The L-value shows brightness, with the greater the numerical value showing higher (desirable) brightness. A value of 78 or more would be considered good. It will vary with additives such as cobalt.

The b-value shows the degree of yellowness, with a higher numerical value showing a higher (undesirable) degree of yellowness. For the laboratory trials, b colors below 7 would be considered a success. Plant values are different because of differences in methods of process control, additives, etc. For plant trials, results within 2 b units of an antimony standard would be considered a success. Prior art may show different L and b values depending on scale of operation, quality of oligomer, quality of recycled glycol, additives, air leakage in system, control of process, and other factors. The only consistent way to measure results is by direct comparison with an antimony standard or a prior art catalyst under comparable conditions.

The following solutions were used as catalysts or additives to the process.

Catalyst solution A was made by dissolving 224 g titanium bis-ammonium lactate solution, 22 g lactic acid, and 123 g of zinc acetate in 270 gm of water, followed by agitation to dissolve the zinc acetate.

Catalyst solution B was made by dissolving 224 g titanium bis ammonium lactate solution, 43 g lactic acid, and 432 g zinc acetate in 1035 g of water, followed by agitation to dissolve the zinc acetate.

Catalyst solution C was made by dissolving 432 g zinc acetate in 1035 g of water, followed by agitation to dissolve the zinc acetate.

Table 2 shows that the use of mixtures of aqueous solutions of organic complexes of titanium and zinc had high catalytic activity and produced esters and polyesters with excellent color value compared to use of zinc or titanium separately.

TABLE 2

Performance of Catalyst Compositions

| Example | Ti (ppm) | Zn (ppm) | Co (ppm) | P (ppm) | Time (min) | L color | b color | Footnote |
|---|---|---|---|---|---|---|---|---|
| 1C | 10 | 20 | 10 |  | 65 | 79.39 | 8.02 | 2 |
| 2E | 10 | 20 | 10 |  | 35 | 80.85 | 6.14 | 3 |
| 3C | 10 | 20 | 5 |  | 80 | 77.50 | 7.16 | 2 |
| 4E | 10 | 20 | 5 |  | 70 | 79.05 | 6.30 | 3 |
| 5C |  | 70 |  |  | 105 | 83.07 | 4.84 | 6 |
| 6C | 25 |  |  |  | 65 | 77.30 | 9.12 | 7 |
| 7E | 10 | 70 |  |  | 50 | 78.89 | 6.43 | 4 |
| 8C | 10 | 70 |  | 50 | 65 | 78.53 | 8.97 | 4 and 5 |
| 9E | 10 | 70 |  | 10 | 55 | 82.46 | 5.79 | 4 |

1 E indicates an invention example and C indicates a comparative example.
2 Examples 1 and 3 were run with ethylene glycol solution of the individual components; the remaining examples were run with aqueous solutions of the mixed components following the inventive process.
3 Examples 2 and 4 were run with catalyst solution A.
4 Examples 7 and 9 were run with catalyst solution B.
5 Example 8 was run using 110 ppm Mn and catalyst solution B.
6 Example 5 was run using catalyst solution C.
7 Example 6 was run using an aqueous solution of titanium bis-ammonium lactate.

Table 2 shows that using mixtures of aqueous solutions of organic complexes of titanium and zinc had high catalytic activity (shorter reaction time for examples 2 and 4 vs. 1 and 3) and produced products with low b color value.

Examples 7 and 9 show the synergism of using Ti in combination with zinc compared to Ti (example 6) or zinc (example 5) separately. Zinc by itself (example 5) was too slow. Using Ti only (example 6) required a higher Ti concentration (25 ppm vs 10 ppm) to get similar activity to example 7 and produced a product that had a higher b value (9.12 vs. 6.43). Examples 7 and 9 show that by combining low levels of Ti with zinc, good catalytic activity and product color were obtained.

Example 9 differed from example 7 in that 58 g of phosphoric acid was to catalyst solution B. The addition of 10 ppm P to the mixture of 10 ppm Ti and 70 ppm Zn decreased reaction rate slightly, but improved b.

Example 8 shows the effect of adding a mixture of Ti and zinc (catalyst B) to an oligomer made using 120 ppm manganese and 50 ppm P. The use of manganese in combination with catalyst B gave (resulted in) a product having (a) much higher b color (8.97 vs.6.43).

What is claimed is:

1. A process comprising combining an aqueous solution of a titanium α-hydroxycarboxylic acid or its salt and an aqueous solution of a zinc salt with an alcohol to produce an alcohol solution and contacting said alcohol solution with a mixture comprising an organic acid or its salt or its ester and a second alcohol.

2. A process according to claim 1 further comprising introducing phosphorus in the form of a water-soluble phosphorus compound.

3. A process according to claim 2 wherein the molar ratio of (titanium plus zinc) to phosphorus is greater than about 1.5.

4. A process according to claim 1 further comprising a water-soluble cobalt compound.

5. A process according to claim 3 further comprising a water-soluble cobalt compound and the molar ratio of (Ti+Zn+Co)/P is from 1 to 20.

6. A process according to claim 1 wherein said α-hydroxycarboxylic acid is citric acid, lactic acid, malic acid, tartaric acid, glycolic acid, glyceric acid, α-hydroxybutyric acid, α-hydroxypropionic acid, or combinations of two or more thereof.

7. A process according to claim 6 wherein the molar ratio of Zn to Ti is in the range of from 2 to 30.

8. A process according to claim 7 wherein said titanium α-hydroxycarboxylic acid or its salt is titanium bis-ammonium lactate.

9. A process according to claim 3 wherein said titanium α-hydroxycarboxylic acid or its salt is titanium bis-ammonium lactate.

10. A process according to claim 5 wherein said titanium α-hydroxycarboxylic acid or its salt is titanium bis-ammonium lactate.

11. A process according to claim 8 wherein said water-soluble zinc salt is zinc acetate.

12. A process according to claim 9 wherein said water-soluble zinc salt is zinc acetate.

13. A process according to claim 10 wherein said water-soluble zinc salt is zinc acetate.

14. A process according to claim 5 wherein said titanium α-hydroxycarboxylic acid or its salt is titanium bis-ammonium lactate, said zinc salt is zinc acetate, said alcohol is ethylene glycol, said organic acid or its salt or its ester is terephthalic acid or dimethyl terephthalte, and said second alcohol is ethylene glycol.

15. A process comprising combining an aqueous solution of a titanium α-hydroxycarboxylic acid or its salt and an aqueous solution of a zinc salt with a mixture comprising an organic acid or its salt or its ester and an alcohol.

16. A process according to claim 15 further comprising introducing phosphorus in the form of a water-soluble phosphorus compound.

17. A process according to claim 16 wherein the molar ratio of (titanium plus zinc) to phosphorus is greater than about 1.5.

18. A process according to claim 15 further comprising a water-soluble cobalt compound.

19. A process according to claim 17 further comprising a water-soluble cobalt compound and the molar ratio of (Ti+Zn+Co)/P is from 1 to 20.

20. A process according to claim 15 wherein said α-hydroxycarboxylic acid is citric acid, lactic acid, malic acid, tartaric acid, glycolic acid, glyceric acid, α-hydroxybutyric acid, α-hydroxypropionic acid, or combinations of two or more thereof.

21. A process according to claim 20 wherein the molar ratio of Zn to Ti is in the range of from 2 to 30.

22. A process according to claim 21 wherein said titanium α-hydroxycarboxylic acid or its salt is titanium bis-ammonium lactate.

23. A process according to claim 17 wherein said titanium α-hydroxycarboxylic acid or its salt is titanium bis-ammonium lactate.

24. A process according to claim 19 wherein said titanium α-hydroxycarboxylic acid or its salt is titanium bis-ammonium lactate.

25. A process according to claim 22 wherein said water-soluble zinc salt is zinc acetate.

26. A process according to claim 23 wherein said water-soluble zinc salt is zinc acetate.

27. A process according to claim 24 wherein said water-soluble zinc salt is zinc acetate.

28. A process according to claim 19 wherein said titanium α-hydroxycarboxylic acid or its salt is titanium bis-ammonium lactate, said zinc salt is zinc acetate, said organic acid or its salt or its ester is terephthalic acid or dimethyl terephthalte, and said alcohol is ethylene glycol.

29. A process comprising contacting terephthalic acid or dimethyl terephthalate, in the presence of a catalyst composition, with ethylene glycol wherein said composition comprises or is produced by combining (1) an aqueous solution of titanium bis-ammonium lactate and an aqueous solution of zinc acetate with ethylene glycol or (2) an aqueous solution of titanium bis-ammonium lactate and an aqueous solution of zinc acetate.

* * * * *